United States Patent
Benkler

(10) Patent No.: US 6,789,841 B2
(45) Date of Patent: Sep. 14, 2004

(54) ENTRANCE STRIP FOR A VEHICLE DOOR OPENING AND METHOD OF MAKING SAME

(75) Inventor: Olaf Benkler, Neuhausen/Hamberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/378,684

(22) Filed: Mar. 5, 2003

(65) Prior Publication Data

US 2003/0197399 A1 Oct. 23, 2003

(30) Foreign Application Priority Data

Mar. 5, 2002 (DE) .......................................... 102 09 665

(51) Int. Cl.[7] .............................................. B60R 27/00
(52) U.S. Cl. ....................................................... 296/209
(58) Field of Search ........................... 296/209, 203.03, 296/30

(56) References Cited

U.S. PATENT DOCUMENTS

| | | | |
|---|---|---|---|
| 2,281,586 A | * 5/1942 | Kramer | ................... 296/209 |
| 2,657,948 A | 11/1953 | Sturtevant | |
| 2,997,329 A | 8/1961 | Chapman | |
| 5,288,121 A | * 2/1994 | Graves | ................... 296/209 |
| 5,671,967 A | * 9/1997 | Gurganus et al. | ............ 296/209 |

FOREIGN PATENT DOCUMENTS

| | | | |
|---|---|---|---|
| DE | 1455855 | 6/1969 | |
| DE | 004315151 A1 | * 11/1994 | ................ 428/593 |
| DE | 29920234 | 2/2000 | |
| GB | 463197 | 3/1937 | |

\* cited by examiner

*Primary Examiner*—Lori L. Coletta
(74) *Attorney, Agent, or Firm*—Crowell & Moring LLP

(57) ABSTRACT

An entrance strip for a motor vehicle, a stepping surface for generating an antislip capacity is provided with an insertion element which has a rubber strip framed by an inner as well as an outer cover.

33 Claims, 3 Drawing Sheets

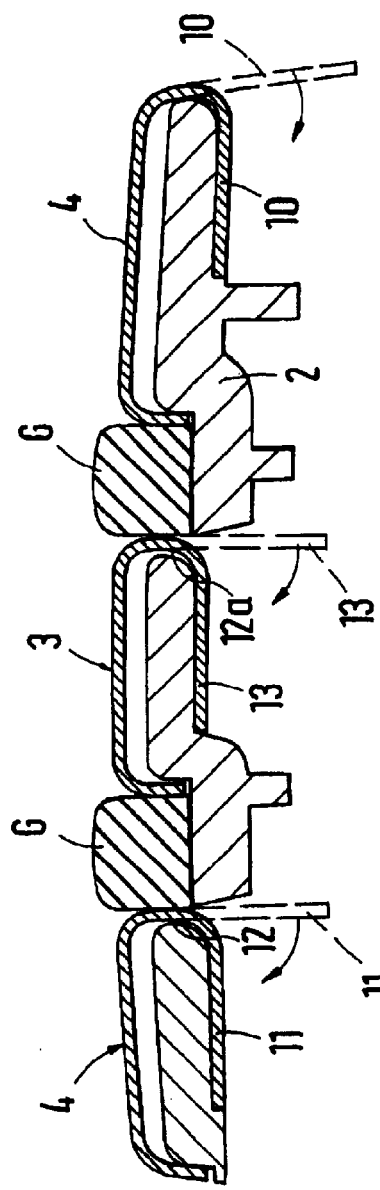
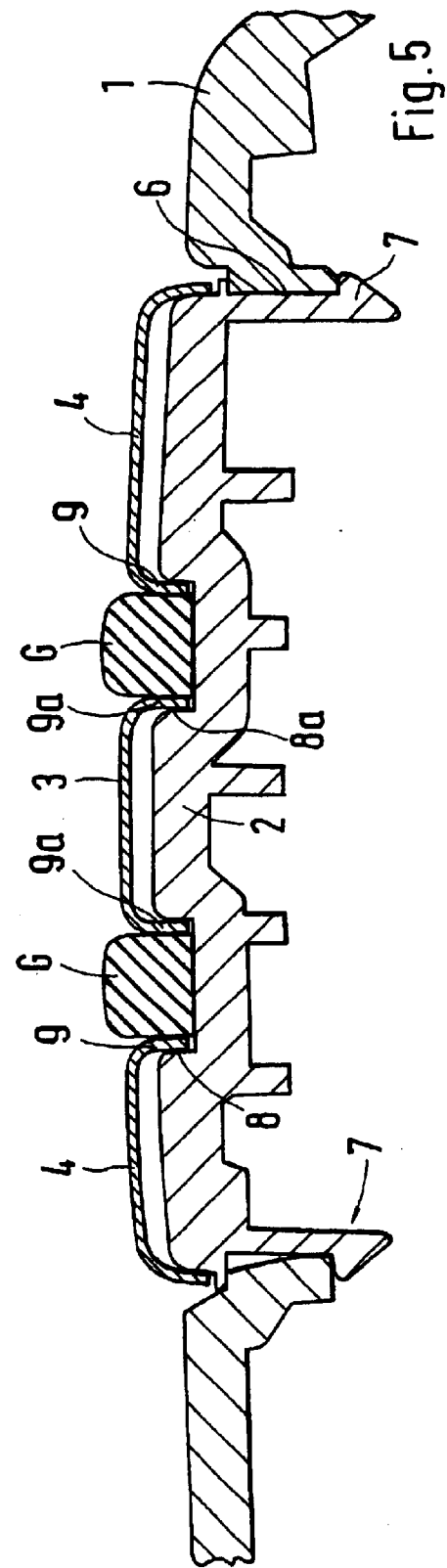

US 6,789,841 B2

ENTRANCE STRIP FOR A VEHICLE DOOR OPENING AND METHOD OF MAKING SAME

This application claims the priority of German Application No. 102 09 665.1 filed Mar. 5, 2002 the disclosure of which is expressly incorporated by reference herein.

The invention relates to an entrance strip for a motor vehicle according to an entrance strip for a motor vehicle which is connected with a side member of a vehicle body and comprises an insert element which forms a stepping surface in a door opening.

From German Patent Document DE 299 20 234 U1, an entrance strip is known which is arranged on an entrance opening of a motor vehicle. This entrance strip consists essentially of an entrance profile which has grooves extending in the longitudinal direction on its top side, into which grooves moldings are inserted which are made of metal.

It is an object of the invention to provide an entrance strip for a motor vehicle which has an insertion element as the tread which is easy to mount and ensures a non-slip entrance and exit.

According to the invention, this object is achieved by providing an entrance strip for a motor vehicle which is connected with a side member of a vehicle body and comprises an insertion element which forms a stepping surface in a door opening, wherein the insertion element comprises a carrier held in a cutout of the entrance strip, which carrier has at least one rubber strip on the top side, which rubber strip is arranged between an exterior-side cover and another interior-side cover.

Important advantages achieved by means of the invention are that the insertion element in the form of a carrier can be snapped in a preassembled manner into a cutout of an entrance strip of a motor vehicle. For this purpose, the insertion element has a carrier which is held in a cutout of the entrance strip and which has rubber strips inserted on the top side, which rubber strips are arranged between an exterior first cover and an interior second cover. As a result of this construction of the carrier and of the covers, the rubber strips are securely held on the carrier by means of a complete enclosure from all sides.

A fastening of the carrier takes place by means of hook elements which are arranged on the edge side and can be hooked into a cutout of the entrance strip and can thereby be fastened. The two covers are connected with the carrier by way of several tabs. The carrier can therefore be fastened without additional screwing devices or other devices in the carrier, and the covers can also be fixed to this carrier in a simple manner by means of the tabs, so that an uncomplicated exchange of the covers and of the rubber strips respectively becomes possible.

The rubber strips preferably consist of mutually spaced longitudinal strands which, by way of cross strands, form a closed and rectangularly developed rubber strip. The closed rubber strip is arranged in a clearance between the outer cover and the inner cover. The rubber strip projects beyond the outer surfaces of the covers. By means of this arrangement of the rubber strip on the carrier between the two covers, an antislip surface is created in the stepping area on a side member of the vehicle which antislip surface, after it is worn out, can simply be exchanged as a whole or only in parts by means of a few manipulations.

The fastening of the covers by means of the tabs takes place by a bending toward the carrier, in which case the tabs of the outer cover are bent on the edge side of the carrier or the tabs are fitted through slots of the carrier and the covers can be fixed by the bending of the tabs.

The covers preferably are formed of a special steel plate. However, other materials, such as carbon, are also conceivable.

Other objects, advantages and novel features of the present invention will become apparent from the following detailed description of the invention when considered in conjunction with the accompanying drawings.

BRIEF DESCRIPTION OF THE DRAWINGS

FIG. 4 is a sectional view of the insertion element according to Line IV—IV of FIG. 2; and FIG. 5 is a sectional view of the insertion element according to Line V—V of FIG. 2.

DETAILED DESCRIPTION OF THE DRAWINGS

Figure 1:
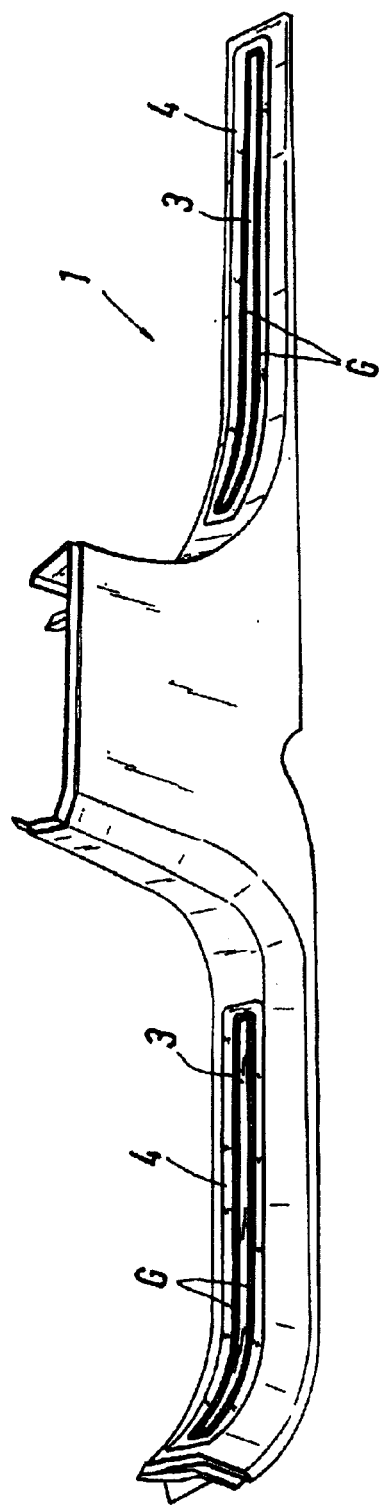
FIG. 1 is a diagrammatic representation of an entrance strip with an inserted insertion element constructed according to a preferred embodiment of the present invention.

An entrance strip 1 for a motor vehicle is arranged on a door sill of a vehicle body, in the door opening. An insertion element E constructed as a carrier 2 for covers 3, 4 is inserted in this entrance strip 1, a rubber strip or several strips 5 being provided between the two covers 3 and 4.

The entrance strip 1 covers the door sill, and the carrier 2 is inserted in this strip 1 in a cutout and is fastened by way of edge-side hook elements 7 on downward extending hook lees 6, as illustrated in detail in FIG. 5.

Groove-shaped receiving devices 8,8a, in which the rubber strip 5 is held in a form-fitting manner, are molded into the support 2 consisting, for example, of a plastic material. The covers 3, 4, which have a U-profile-shaped cross-section and whose legs 9a, 9 engage in the receiving devices 8, 8a, are placed on the carrier 2. One cover 4 has a cutout 20 and surrounds the rubber strip G from the outside, and the other cover 3 is arranged between the rubber strip sections G.

Figure 2:
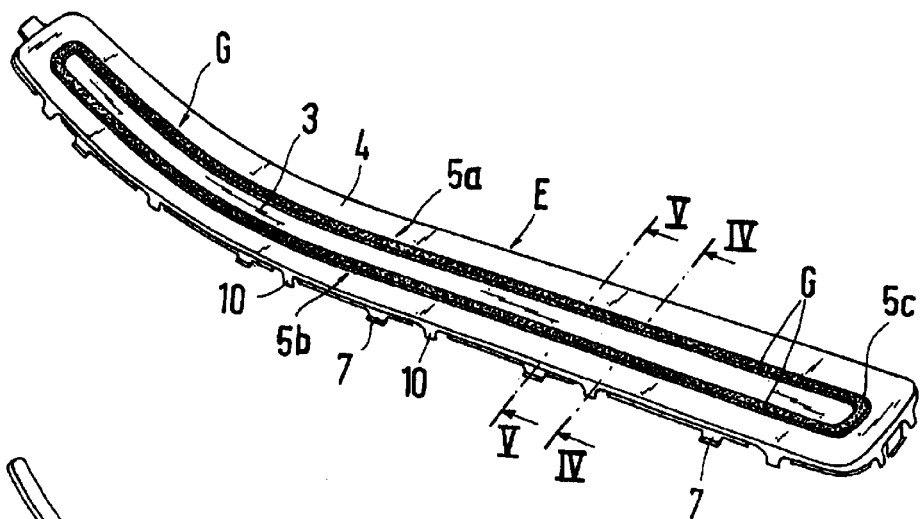
FIG. 2 is a diagrammatic representation of the insertion element with an outer cover and an inner cover and a rubber strip.
Figure 3:
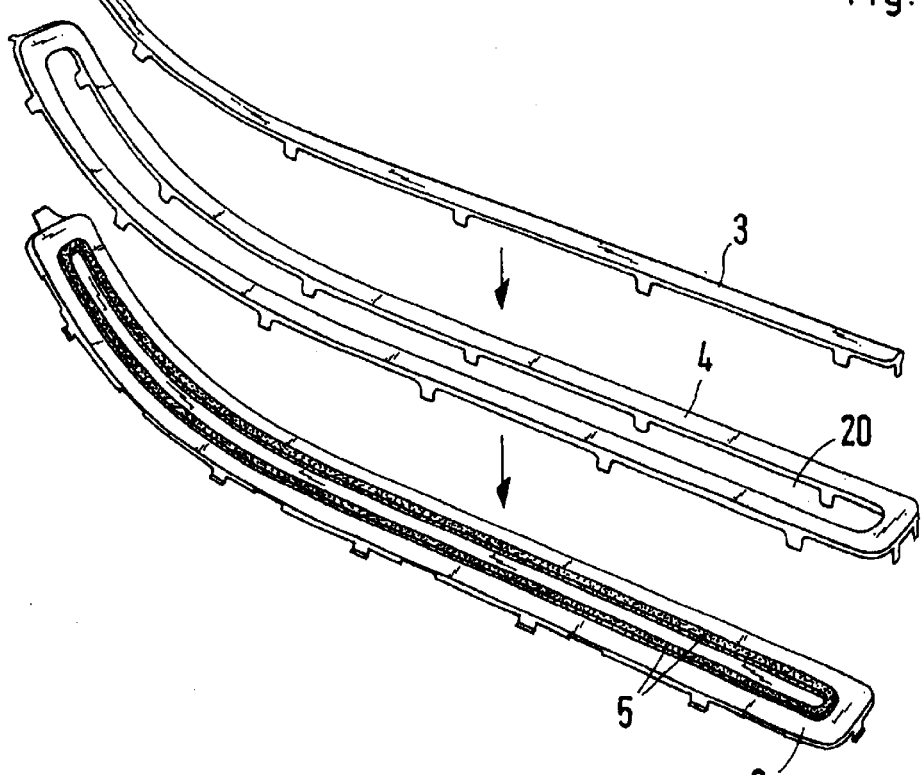
FIG. 3 is an exploded schematic view of the insertion element with the covers which are capable of being fitted together.

According to the embodiment illustrated, the rubber strip G is formed with two strands 5a, 5b which are situated in parallel and at a distance from one another and which have the narrow cover 3 between them. The strands 5a, 5b are connected by end strand 5c as shown in FIG. 2. The rubber strip 5 preferably extends on the whole in the longitudinal direction of the carrier 2 almost along the entire carrier length and is constructed as a closed surrounding rubber strip G.

A connection between the outer cover 4 and the carrier 1 is, for example, established by way of edge-side tabs 10 as well as interior additional tabs 11 which are bent for the fastening on the carrier 2, as illustrated in detail in FIG. 4. The additional tabs 11 are fitted through slots 12 of the carrier 2 and are also bent for the purpose of a fastening.

The fastening of the inner cover 3 to the carrier 2 also takes place by way of edge-side tabs 13 which are fitted through slots 12a of the carrier, and a fastening of the inner cover 3 to the carrier 2 can take place by means of bending.

The covers 3 and 4 preferably consist of a special steel plate which covers the entire surface of the carrier 2, and the rubber strip G is disposed to be protruding with respect to the covers 3, 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Entrance strip for a motor vehicle which is connected with a side member of a vehicle body and comprises an insertion element which forms a stepping surface in a door opening, wherein the insertion element comprises a carrier held in a cutout of the entrance strip, which carrier has at least one rubber strip on a top side of the carrier, which rubber strip is arranged between an outer cover and an inner cover.

2. Entrance strip according to claim 1, wherein the carrier can be fastened by means of hook elements on its edge side in the cutout of the entrance strip, and the two covers include tabs for connecting the cover with carrier.

3. Entrance strip according to claim 1, wherein the rubber strip includes mutually spaced longitudinal strands which, by way of cross strands, form a closed and rectangularly developed rubber strip.

4. Entrance strip according to claim 2, wherein the rubber strip includes mutually spaced longitudinal strands which, by way of cross strands, form a closed and rectangularly developed rubber strip.

5. Entrance strip according to claim 3, wherein the closed rubber strip is arranged in a clearance between the outer cover and the inner cover.

6. Entrance strip according to claim 1, wherein the rubber strip protrudes above the outer surface of the covers.

7. Entrance strip according to claim 2, wherein the rubber strip protrudes above the outer surface of the covers.

8. Entrance strip according to claim 3, wherein the rubber strip protrudes above the outer surface of the covers.

9. Entrance strip according to claim 4, wherein the rubber strip protrudes above the outer surface of the covers.

10. Entrance strip according to claim 1, wherein interior tabs of the outer cover and exterior tabs of the inner cover are fitted through slots in the carrier and are fixed to the carrier by means of a bending of the tabs.

11. Entrance strip according to claim 2, wherein interior tabs of the outer cover and exterior tabs of the inner cover are fitted through slots in the carrier and are fixed to the carrier by means of a bending of the tabs.

12. Entrance strip according to claim 3, wherein interior tabs of the outer cover and exterior tabs of the inner cover are fitted through slots in the carrier and are fixed to the carrier by means of a bending of the tabs.

13. Entrance strip according to claim 5, wherein interior tabs of the outer cover and exterior tabs of the inner cover are fitted through slots in the carrier and are fixed to the carrier by means of a bending of the tabs.

14. Entrance strip according to claim 6, wherein interior tabs of the outer cover and exterior tabs of the inner cover are fitted through slots in the carrier and are fixed to the carrier by means of a bending of the tabs.

15. Entrance strip according to claim 10, wherein the exterior tabs of the outer cover reach around the carrier from the outside for fastening.

16. Entrance strip according to claim 11, wherein the exterior tabs of the outer cover reach around the carrier from the outside for fastening.

17. Entrance strip according to claim 12, wherein the exterior tabs of the outer cover reach around the carrier from the outside for fastening.

18. Entrance strip according to claim 13, wherein the exterior tabs of the outer cover reach around the carrier from the outside for fastening.

19. Entrance strip according to claim 14, wherein the exterior tabs of the outer cover reach around the carrier from the outside for fastening.

20. Entrance strip according to claim 1, wherein the carrier consists of a plastic material, and the covers consist of a steel material.

21. Entrance strip according to claim 2, wherein the carrier consists of a plastic material, and the covers consist of a steel material.

22. Entrance strip according to claim 5, wherein the carrier consists of a plastic material, and the covers consist of a steel material.

23. Entrance strip according to claim 6, wherein the carrier consists of a plastic material, and the covers consist of a steel material.

24. Entrance strip according to claim 1, wherein the covers have a U-profile-shaped cross-section and engage with their legs in groove-shaped receiving devices, and the rubber strip is held in a form-fitting manner between the legs of the receiving device.

25. Entrance strip according to claim 2, wherein the covers have a U-profile-shaped cross-section and engage with their legs in groove-shaped receiving devices, and the rubber strip is held in a form-fitting manner between the legs of the receiving device.

26. Entrance strip according to claim 5, wherein the covers have a U-profile-shaped cross-section and engage with their legs in groove-shaped receiving devices, and the rubber strip is held in a form-fitting manner between the legs of the receiving device.

27. Entrance strip according to claim 6, wherein the covers have a U-profile-shaped cross-section and engage with their legs in groove-shaped receiving devices, and the rubber strip is held in a form-fitting manner between the legs of the receiving device.

28. Entrance strip according to claim 20, wherein the covers have a U-profile-shaped cross-section and engage with their legs in groove-shaped receiving devices, and the rubber strip is held in a form-fitting manner between the legs of the receiving device.

29. A method of making an entrance strip for a motor vehicle door opening, comprising:

providing a carrier configured to be fitted in a vehicle door cut out, applying a rubber strip on a top side of the carrier intermediate an exterior-side cover and an interior-side cover.

30. A method according to claim 29, comprising connecting the covers by means of tabs with the carrier.

31. A method according to claim 30, wherein interior tabs of the outer cover and exterior tabs of the inner cover are fitted through slots in the carrier and are fixed to the carrier by means of a bending of the tabs.

32. A method according to claim 31, wherein the carrier consists of a plastic material, and the covers consist of a special steel material.

33. A method according to claim 32, wherein the covers have a U-profile-shaped cross-section and engage with their legs in groove-shaped receiving devices, and the rubber strip is held in a form-fitting manner between the legs of the receiving device.

* * * * *